Oct. 24, 1967    J. M. BAKER    3,348,660
CONVEYORS
Original Filed Aug. 13, 1963    5 Sheets-Sheet 1

Oct. 24, 1967   J. M. BAKER   3,348,660
CONVEYORS
Original Filed Aug. 13, 1963   5 Sheets-Sheet 2

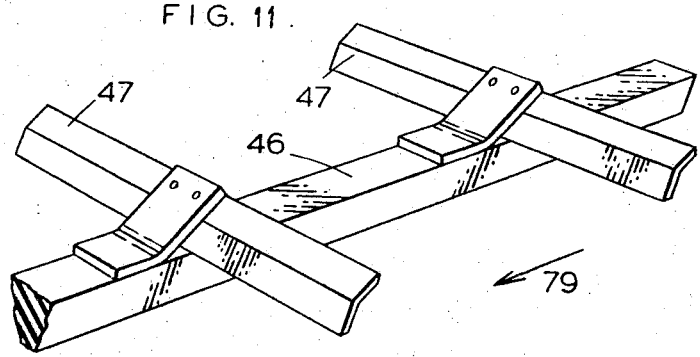

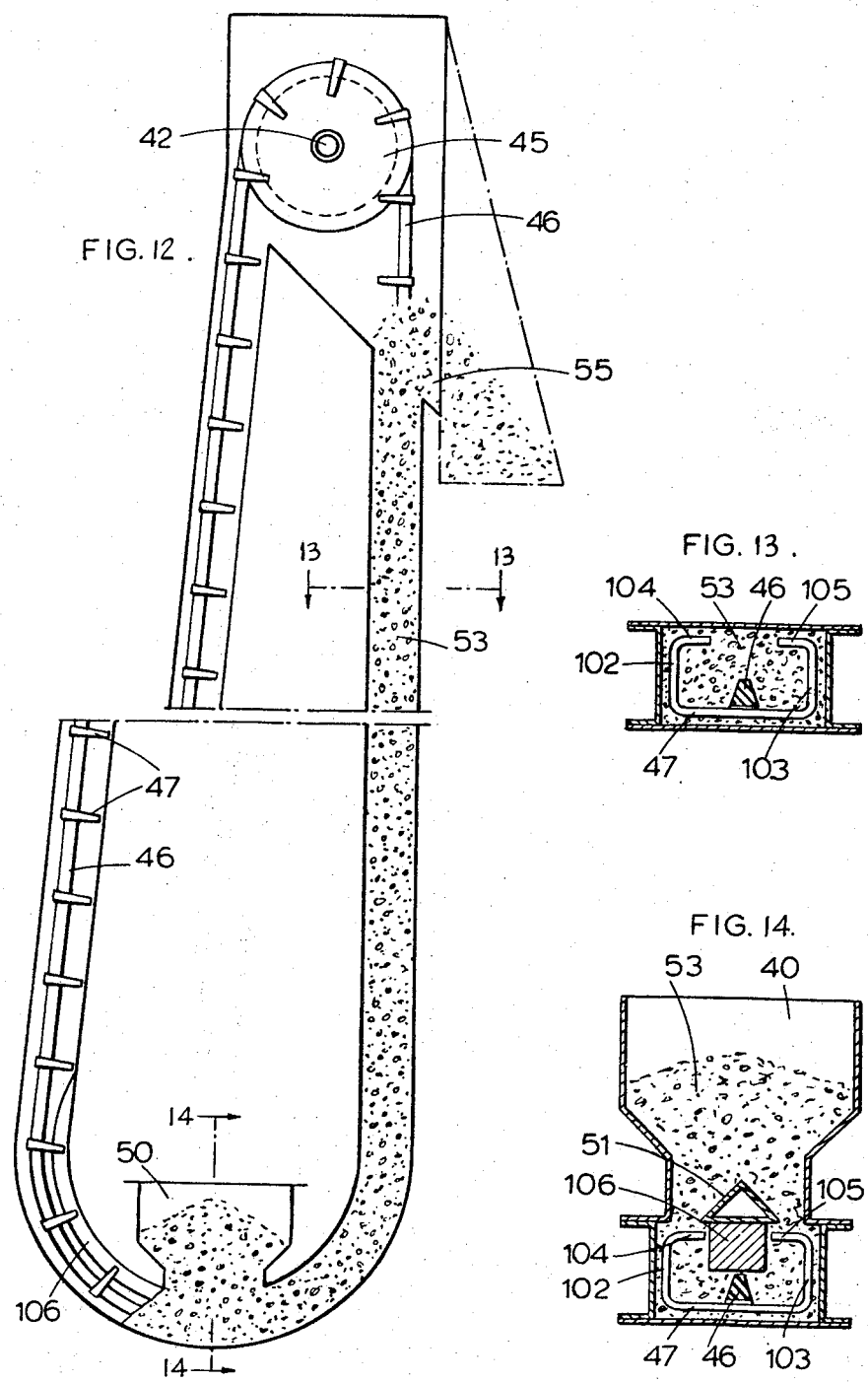

United States Patent Office 3,348,660
Patented Oct. 24, 1967

3,348,660
CONVEYORS
James Mundy Baker, Bristol, England, assignor to James Baker Conveyors Limited, Bristol, England
Original application Aug. 13, 1963, Ser. No. 302,768, now Patent No. 3,219,173, dated Nov. 23, 1965. Divided and this application July 28, 1965, Ser. No. 477,993
Claims priority, application Great Britain, Aug. 13, 1962, 30,938/62
9 Claims. (Cl. 198—168)

This is a division of Baker application, S.N. 302,768 filed Aug. 13, 1963, now Patent 3,219,173, issued Nov. 23, 1965.

This invention relates to conveyors for conveyance of grain or other particulate material. It is well known to convey such material along a trough by means of an endless chain which carries transverse bars each extending on both sides of the chain, the chain being driven by a sprocket. The bars are welded to the link of the chain and the chain and bars run in the trough and conveys the material along the trough. The chain is expensive and heavy and its maximum speed is not as high as is desirable.

It was suggested many years ago to replace the chain by a steel wire and in experimental practice the bars were attached to the steel wire by clamps extending around the wire. This also necessitated driving by means of sprockets or by wheels having notches to receive the clamps. These experiments were however abandoned because the conveyor could not run at high speed and steel ropes running around small diameter wheels quickly frayed.

The problem of running endless conveyors at high speeds (e.g. over 400 and up to 1200 feet per minute or even faster) has remained unsolved.

The present invention has however solved this problem and conveyors of the present invention have been operated at high speed with conveyance of a large tonnage rate of grain, chicken meal, and other products.

According to the present invention the conveyor comprises a housing containing an approximately V-section endless belt running on at least one V-grooved driving wheel at one end and suitably supported at its other end, said belt having transverse bars attached thereto by attachment means which leave the driven faces of the V-belt free from projections.

Thus the long existing problem has been solved essentially by the use of a V-belt whereby the transverse conveyor bars can be attached by fixing means which do not project over the side surfaces of the V-belt and the side surfaces therefore present continuous friction surfaces which can be driven at high speed.

The invention will now be further described by way of example with reference to the accompanying drawings wherein.

Figure 1:
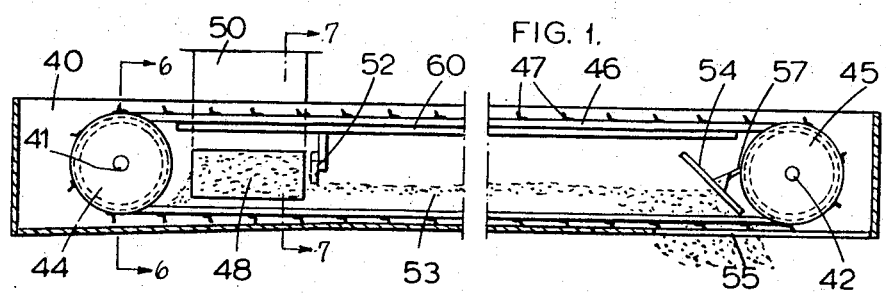
FIGURE 1 is a vertical section of a conveyor made in accordance with the invention.
Figure 6:
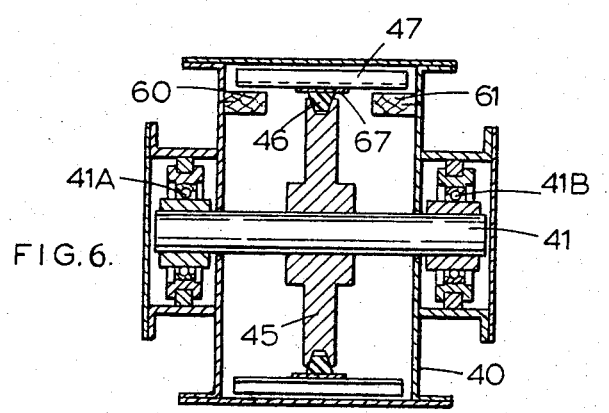
Figure 7:
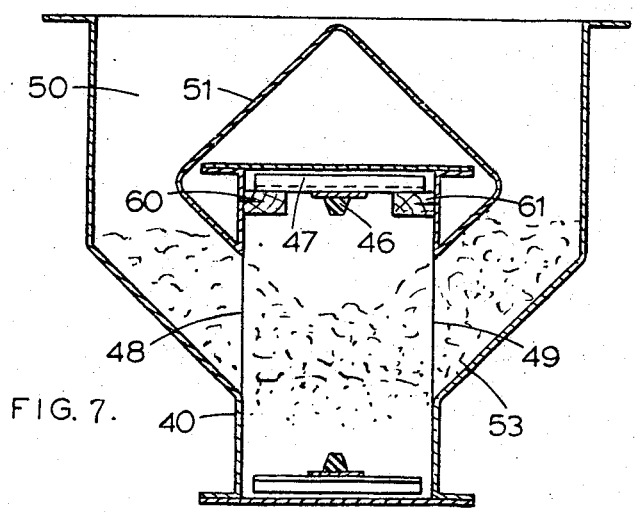
Figure 8:
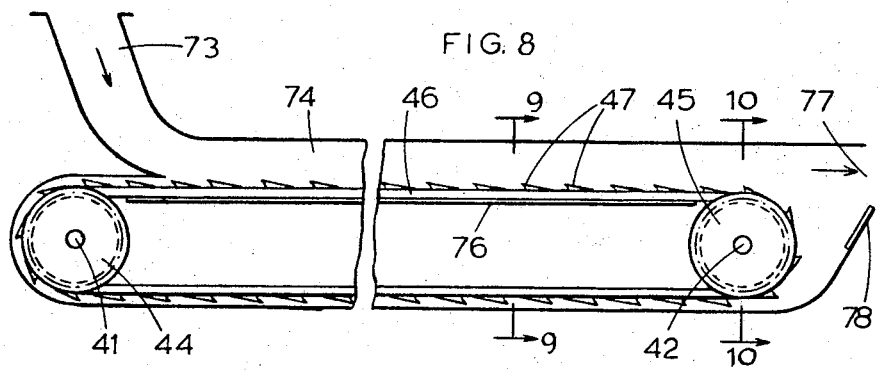
Figure 9:
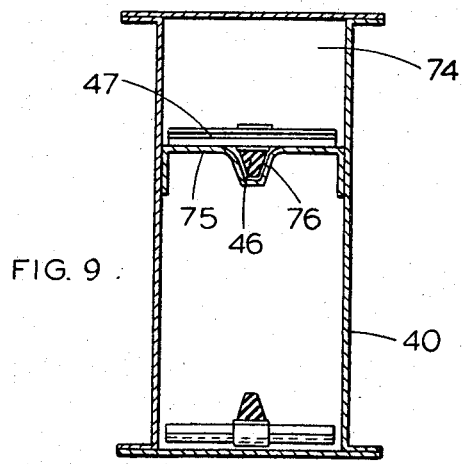
Figure 10:
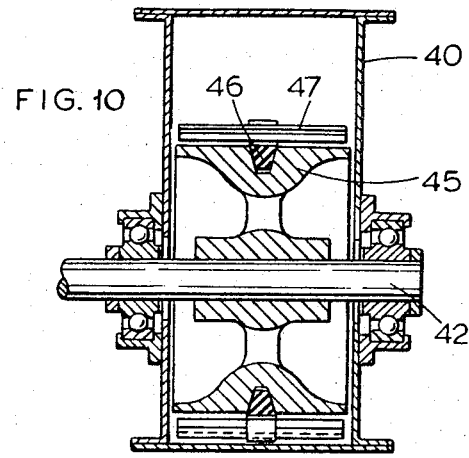

FIGURES 6 and 7 are sectional views on lines 7—7 and 8—8 respectively on FIGURE 1, certain parts being omitted from FIGURE 6;

FIGURE 8 is a view similar to FIGURE 1 but showing a modified construction;

FIGURES 9 and 10 are sectional views on lines 10—10 and 11—11 on FIGURE 8;

FIGURE 11 shows a further modification of the belt and bar to be described;

FIGURE 12 shows a vertical section of a vertical lift conveyor of the present invention; and FIGURES 13 and 14 are sectional views on lines 30—30 and 31—31 on FIGURE 12.

Figure 2:
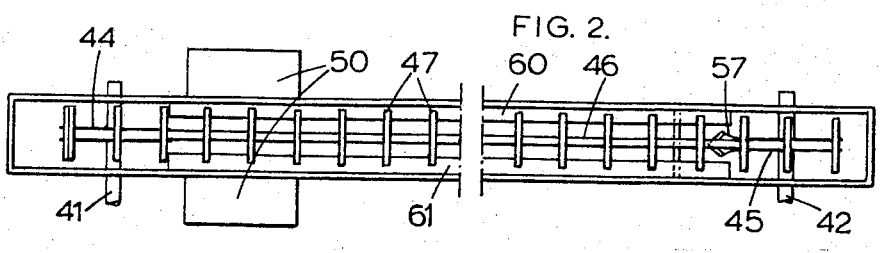
FIGURE 2 is a plan view thereof.

In FIGURES 1 and 2 a housing or trough 40 carries spindles 41, 42 at opposite ends on which V-grooved pulley wheels 44, 45 are mounted. One of the wheels is driven and the other is free running. A V-belt 46 carries elements which may be transverse conveyor bars 47 on its outer surface. The sides of the conveyor adjacent pulley 44 has inlet openings 48, 49 (FIGURE 7). A hopper 50 and bridge 51 feed material to the openings 48, 49 and the depth of the material on the bottom of the housing is controlled by an adjustable baffle 52. The material 53 is conveyed by the lower run of the belt along the housing, the whole depth of the material being a continuously moving column. At the other end a baffle 54 directs the material to an outlet opening 55 in the bottom of the housing. A scraper 57 cleans the V-groove of pulley 45. The upper run of the belt is supported by bearing strips 60, 61 attached to the side walls of the housing. The spindle 41 may be mounted in bearings 41A, 41B (FIGURE 6) adjustable lengthwise of the housing. The spindle 42 may be mounted in bearings and driven from an electric motor through a reduction gear.

Figure 3:
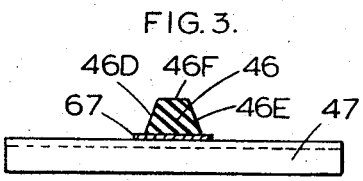
FIGURE 3 is a sectional view on FIGURE 5 and the latter is a perspective view of part of the belt and transverse bars.
Figure 4:
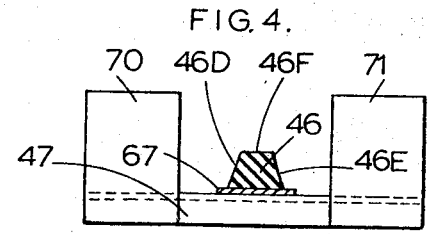
FIGURE 4 is a sectional view similar to FIGURE 3, showing a modified construction.
Figure 5:
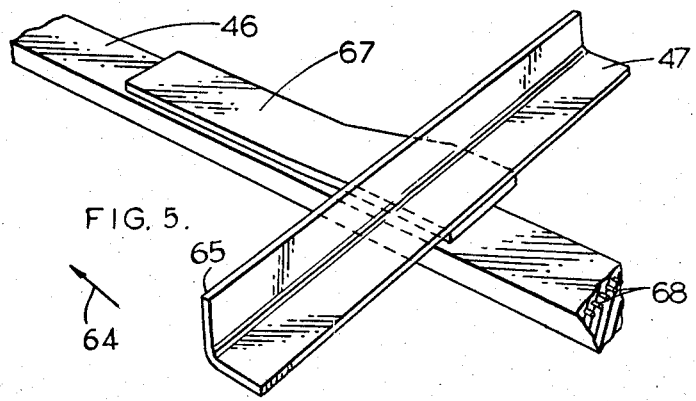

FIGURES 3, 4, 5 show an alternative construction in which a solid V-belt has connecting members which may be flexible strips of rubber canvas, leather, synthetic plastic or the like 67 attached to it by adhesive (e.g. an epoxy resin). The belt 46 may be formed of rubber and canvas and may be strengthened by steel wires 68. In this construction also the side surfaces 46D, 46E of the belt are unbroken continuous surfaces engaged frictionally by the V-grooves of the pulleys. The bar 47, e.g. wood, leather, rubber or synthetic rubber, may be for example 4 to 8 inches wide or wide enough to suit the housing and may be about half an inch square cross-section or angle bar. The direction of travel is shown by arrow 64 whereby the free part 65 of the bar tends to dig into the material 53 and the pressure of the latter urges the bar towards the belt.

It will be understood that the V belt and grooves do not have a sharp apex but the belt normally has a blunt surface 46F spaced from the bottom of the pulley grooves.

FIGURE 4 shows extensions 70, 71 attached to the ends of the bars 47 transversely thereof which are particularly useful for carrying material upwards.

FIGURES 8, 9 and 10 show a modification in which the housing 40 has a top chute 73 at one end leading to a channel 74 above the upper run of the belt where the material is conveyed over a support platform 75 the latter having a channel 76 to receive the belt 46. The housing has an outlet 77 at its upper part level with the channel 74 provided with an adjustable baffle 78. The pulleys 44, 45 extend across the width of the housing to form a continuous surface for the material. The chute 73 enables the material to achieve some speed in the direction of travel of the belt before reaching the belt and the material finally shoots out of the outlet 77 at high speed.

FIGURE 11 shows bars 47 suitable for the top-run conveyor of FIGURES 8–10 these bars being angle bars arranged also so that they tend to dig into the material and the pressure of the latter urges the bars towards the belt. The arrow 79 shows the direction of movement.

FIGURES 12, 13, 14 show a conveyor for elevating the material in a vertical or approximately vertical direction. The housing is in the form of a loop surrounding the belt. The belt runs round the pulley 45 at the top and around a curved bearing plate 106 at the bottom. The material is conveyed from the hopper 50 at the bottom to a discharge opening 55 at the top. The bars 47 have transverse extensions 102, 103 at their ends and the ends of these extensions carry projections 104, 105 which extend inwardly towards each other into close proximity to the pulley.

The invention provides a conveyor of high speed and capacity which however is inexpensive and of small size and involves low maintenance and running costs.

I claim:
1. A conveyor comprising:
  (a) a housing,
  (b) an endless belt having an approximately V-section, arranged within said housing,
  (c) at least one V-grooved driving wheel supporting the belt at one end thereof,
  (d) means for supporting the belt at the other end thereof,
  (e) a plurality of flexible strips connected at intervals along the outside surface of the belt in such a manner as to leave the driven faces of the V-belt free from projections,
  (f) transverse bars connected respectively to said flexible strips at the free ends thereof and arranged to move in close proximity to at least a part of the inside surface of the housing,
  (g) said flexible strips being of such a length that the bars have some freedom of movement towards and away from the belt, and
  (h) said bars being inclined to said inside surface of the housing so that the pressure thereon from the conveyed material urges them towards said inside surface of the housing.

2. A conveyor comprising:
  (a) a housing, having an inside surface and an outside surface,
  (b) an endless belt arranged within said housing, said belt having an approximately V-cross sectional profile, said belt having an outside surface and two driven surfaces, said driven surfaces being free from projections,
  (c) at least one V-grooved driving wheel supporting one end of said belt,
  (d) a plurality of connecting members disposed at intervals on said outside surface of said belt, and
  (e) transverse elements joined respectively to said connecting members and disposed between said belt and the inside surface of said housing, said transverse elements having freedom of movement toward and away from said belt, said transverse elements being inclined to said inside surface of said housing so that pressure thereon from conveyed material urges said elements toward said inside surface of said housing.

3. A conveyor as claimed in claim 2 wherein side bar extensions are provided on said bars at their ends, said side bar extensions being transverse to said bars.

4. A conveyor as claimed in claim 3 wherein inwardly projecting parts are provided on said side bar extensions which inwardly projecting parts closely approach said wheel and means for supporting said other end of said belts.

5. A conveyor as claimed in claim 2 wherein supporting runners are provided between said wheel and means for supporting the other end of said belt, said bars running on said supporting runners.

6. A conveyor as claimed in claim 2 wherein the material is conveyed by a lower run of said belt at the bottom of said housing.

7. A conveyor as claimed in claim 2 wherein said belt conveys approximately vertically and wherein a bearing plate is provided at the lower end of said belt, said belt running round said bearing plate.

8. A conveyor as claimed in claim 2 in which an upper run of the belt conveys the material along a support plate at the upper end of the housing, said plate having a trough to receive the belt.

9. A conveyor as claimed in claim 8 wherein said at least one wheel extends across the width of the housing.

References Cited

UNITED STATES PATENTS

| Re. 22,789 | 9/1946 | Brunner | 198—168 |
| 2,800,219 | 7/1957 | Carroll | 198—168 X |

FOREIGN PATENTS

| 469,766 | 8/1937 | Great Britain. |

EVON C. BLUNK, *Primary Examiner.*

EDWARD A. SROKA, *Examiner.*